United States Patent
Kim et al.

(10) Patent No.: US 11,827,248 B2
(45) Date of Patent: Nov. 28, 2023

(54) AUTONOMOUS CONTROLLER, VEHICLE SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventors: Dae Young Kim, Gwangmyeong-si (KR); Jin Su Jeong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 311 days.

(21) Appl. No.: 17/123,747

(22) Filed: Dec. 16, 2020

(65) Prior Publication Data
US 2021/0188324 A1 Jun. 24, 2021

Related U.S. Application Data

(60) Provisional application No. 62/950,084, filed on Dec. 18, 2019.

(30) Foreign Application Priority Data

Oct. 27, 2020 (KR) .................. 10-2020-0140556

(51) Int. Cl.
*B60W 60/00* (2020.01)
*B60W 40/08* (2012.01)

(52) U.S. Cl.
CPC ........ *B60W 60/0059* (2020.02); *B60W 40/08* (2013.01); *B60W 60/0051* (2020.02);
(Continued)

(58) Field of Classification Search
CPC ............. B60W 60/0059; B60W 40/08; B60W 60/0051; B60W 60/0053; B60W 2420/42;
(Continued)

(56) References Cited

U.S. PATENT DOCUMENTS 10,882,419 B2 1/2021 Wolf
2014/0291523 A1* 10/2014 Kwon .................... B60N 2/806
250/341.7

(Continued)

FOREIGN PATENT DOCUMENTS

DE 10 2015 206501 A 10/2016

OTHER PUBLICATIONS

Extended European Search Report dated May 19, 2021, in corresponding European Application No. 20213404.5-1012 (10 pgs.).

*Primary Examiner* — Nadeem Odeh
(74) *Attorney, Agent, or Firm* — LEMPIA SUMMERFIELD KATZ LLC (57) ABSTRACT

The autonomous controller includes: a processor configured to control autonomous driving and determines whether to enable an autonomous driving mode or to convert the autonomous driving mode into a manual driving mode based on a current position of the driver's seat; and a storage configured to store data and an algorithm run by the processor. The processor controls at least one of whether to enable an autonomous driving mode, whether to restrict position adjustment of the driver's seat, or whether to hand over control authority based on a movement position in a forward or backward direction of the driver's seat or an angle of the backrest of the driver's seat.

20 Claims, 8 Drawing Sheets

(52) U.S. Cl.
CPC ..... B60W 60/0053 (2020.02); *B60W 2420/42* (2013.01); *B60W 2540/10* (2013.01); *B60W 2540/12* (2013.01); *B60W 2540/223* (2020.02); *B60W 2540/225* (2020.02)

(58) Field of Classification Search
CPC ......... B60W 2540/10; B60W 2540/12; B60W 2540/223; B60W 2540/225; B60W 50/14; B60W 2050/0072; B60N 2002/0268
See application file for complete search history.

(56) References Cited

U.S. PATENT DOCUMENTS

| | | | |
|---|---|---|---|
| 2016/0159251 A1* | 6/2016 | Ebina | B60N 2/002 |
| | | | 701/49 |
| 2017/0205823 A1* | 7/2017 | Arndt | B60Q 5/005 |
| 2017/0349185 A1 | 12/2017 | McNew | |
| 2018/0029501 A1 | 2/2018 | Wolf | |
| 2018/0229740 A1* | 8/2018 | Matsumoto | B60N 2/002 |
| 2018/0326994 A1 | 11/2018 | Sakai | |
| 2020/0001880 A1* | 1/2020 | Hyuga | G06V 10/141 |
| 2020/0130546 A1* | 4/2020 | Foltin | B60W 60/0059 |
| 2021/0053590 A1* | 2/2021 | Namba | B60W 40/08 |

\* cited by examiner

AUTONOMOUS CONTROLLER, VEHICLE SYSTEM INCLUDING THE SAME, AND METHOD THEREOF

CROSS-REFERENCE TO RELATED APPLICATION

This application claims priority to and the benefit of U.S. Patent Application No. 62/950,084, filed on Dec. 18, 2019, and Korean Patent Application No. 10-2020-0140556, filed on Oct. 27, 2020, the entire contents of which are incorporated herein by reference.

FIELD

The present disclosure relates to an autonomous controller, a vehicle system including the same, and a method thereof.

BACKGROUND

The statements in this section merely provide background information related to the present disclosure and may not constitute prior art.

The vehicle is a device which travels on the road, which is loaded with various devices for protecting passengers, assisting operation, or improving ride quality.

Recently, research has been actively conducted in an autonomous controller such that the vehicle automatically travels to a destination by controlling the vehicle to recognize road environments for itself, determine driving situations, and travel along a planned driving route.

Such an autonomous controller recognizes a change in location of an obstacle and a line, and controls the vehicle to travel on a safe lane while avoiding the obstacle based on the recognized information.

When an unexpected situation occurs while controlling autonomous driving of the vehicle, the autonomous controller hands over control authority of the vehicle to the driver. However, if the driver's seat is in a state in which the driver cannot immediately take over the control authority, the handing over of the control authority may be delayed and the risk of an accident may be increased.

SUMMARY

The present disclosure provides an autonomous controller for determining whether a position of the driver's seat is located within a safety area of the driver's seat to determine whether to enable an autonomous driving function, monitoring the position of the driver's seat while the autonomous driving function is performed, and requesting the driver to take over control authority or restricting position adjustment of the driver's seat while the autonomous driving function is performed, when the position of the driver's seat departs from the safety area, to safely control autonomous driving, a vehicle system including the same, and a method thereof.

According to one form of the present disclosure, an autonomous controller may include: a processor configured to control autonomous driving, and determine whether to enable an autonomous driving mode or to convert the autonomous driving mode into a manual driving mode based on a current position of the driver's seat; and a storage configured to store data and an algorithm run by the processor. The processor may control at least one of whether to enable the autonomous driving mode, whether to restrict position adjustment of the driver's seat, or whether to hand over control authority based on a movement position in a forward or backward direction of the driver's seat or an angle of the backrest of the driver's seat.

In one form, the processor may prohibit the autonomous driving mode from being enabled, when the movement position in the forward or backward direction of the driver's seat is greater than a predetermined first threshold or the angle of the backrest of the driver's seat is greater than a predetermined second threshold.

In one form, the processor may restrict position adjustment of the driver's seat, while the autonomous driving mode is performed, when the movement position in the forward or backward direction of the driver's seat is greater than a predetermined first threshold or when the angle of the backrest of the driver's seat is greater than a predetermined second threshold.

In one form, the processor may request a driver to take over control authority, while the autonomous driving mode is performed, when the movement position in the forward or backward direction of the driver's seat is greater than a predetermined first threshold or when the angle of the backrest of the driver's seat is greater than a predetermined second threshold.

In one form, the processor may control to perform position adjustment of the driver's seat, in the state where the movement position in the forward or backward direction of the driver's seat is greater than the predetermined first threshold or where the angle of the backrest of the driver's seat is greater than the predetermined second threshold, when there is at least one of when a driver keeps his or her hands on the steering wheel, when the driver manipulates the brake pedal, or when the driver manipulates the accelerator pedal.

In one form, the processor may adjust the first threshold or the second threshold, in the state where the movement position in the forward or backward direction of the driver's seat is greater than the predetermined first threshold or where the angle of the backrest of the driver's seat is greater than the predetermined second threshold, when there is at least one of when a driver keeps his or her hands on the steering wheel, when the driver manipulates the brake pedal, or when the driver manipulates the accelerator pedal.

In one form, the processor may maintain or increase the first threshold or the second threshold.

In one form, the processor may determine a position of the face of a driver or positions of the eyes of the driver and adjusts the first threshold or the second threshold, when the movement position in the forward or backward direction of the driver's seat is greater than the predetermined first threshold or when the angle of the backrest of the driver's seat is greater than the predetermined second threshold, and when the driver keeps his or her hands on the steering wheel.

In one form, the processor may prohibit the first threshold or the second threshold from being adjusted, when a distance between the position of the face of the driver and the driver's seat is greater than or equal to a predetermined distance.

In one form, the processor may prohibit the first threshold or the second threshold from being adjusted, when the distance between the position of the face of the driver and the driver's seat is greater than a distance between the face of the driver and a camera capturing the face of the driver over a predetermined reference value.

In one form, the processor may determine that the movement direction in the forward or backward direction of the driver's seat is greater than a predetermined first threshold when the driver's seat moves to greater than a predetermined position in the backward direction.

In one form, the processor may determine that the angle of the backrest of the driver's seat is greater than a predetermined second threshold when the angle of the backrest of the driver's seat leans forward or backward over a predetermined angle with respect to a right angle.

According to another form of the present disclosure, a vehicle system may include: an autonomous controller configured to control autonomous driving, and determine whether to enable an autonomous driving mode or to convert the autonomous driving mode into a manual driving mode based on a current position of the driver's seat; and a seat position adjustment device that is configured to perform or restrict position adjustment of the driver's seat depending on a command of the autonomous controller. The autonomous controller may control at least one of whether to enable an autonomous driving mode, whether to restrict position adjustment of the driver's seat, or whether to hand over control authority based on a movement position in a forward or backward direction of the driver's seat or an angle of the backrest of the driver's seat.

In one form, the vehicle system may further include a hands-on sensor that senses that a driver keeps his or her hands on the steering wheel and a driver monitoring sensor that senses a position of the face of the driver.

In one form, the autonomous controller may prohibit the autonomous driving mode from being enabled, when the movement position in the forward or backward direction of the driver's seat is greater than a predetermined first threshold or the angle of the backrest of the driver's seat is greater than a predetermined second threshold.

According to another form of the present disclosure, an autonomous control method may include detecting a position of the driver's seat, determining whether to enable an autonomous driving mode or determining to convert the autonomous driving mode into a manual driving mode, based on the position of the driver's seat, and controlling autonomous driving in the determined mode. The determining may include controlling at least one of whether to enable the autonomous driving mode, whether to restrict position adjustment of the driver's seat, or whether to hand over control authority, based on a movement position in a forward or backward direction of the driver's seat or an angle of the backrest of the driver's seat.

In one form, the determining step may include prohibiting the autonomous driving mode from being enabled, when the movement position in the forward or backward direction of the driver's seat is greater than a predetermined first threshold or the angle of the backrest of the driver's seat is greater than a predetermined second threshold.

In one form, the determining step may include controlling to perform position adjustment of the driver's seat, in the state where the movement position in the forward or backward direction of the driver's seat is greater than the predetermined first threshold or where the angle of the backrest of the driver's seat is greater than the predetermined second threshold, when there is at least one of when a driver keeps his or her hands on the steering wheel, when the driver manipulates the brake pedal, or when the driver manipulates the accelerator pedal.

In one form, the determining may include restricting position adjustment of the driver's seat, while the autonomous driving mode is performed, when the movement position in the forward or backward direction of the driver's seat is greater than a predetermined first threshold or when the angle of the backrest of the driver's seat is greater than a predetermined second threshold.

In one form, the determining may include requesting a driver to take over control authority, while the autonomous driving mode is performed, when the movement position in the forward or backward direction of the driver's seat is greater than a predetermined first threshold or when the angle of the backrest of the driver's seat is greater than a predetermined second threshold.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Hereinafter, various forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing the components of various form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

One form of the present disclosure may discloses technologies of determining whether to enable an autonomous driving function depending on a position of the driver's seat, and restricting position adjustment of the driver's seat or continuing monitoring a position of the driver's seat to automatically hand over control authority to a driver when the driver's seat is changed to a position unsuitable for autonomous driving.

Hereinafter, embodiments and implementations of the present disclosure will be described in detail with reference to FIGS. 1 to 4C.

Figure 1:
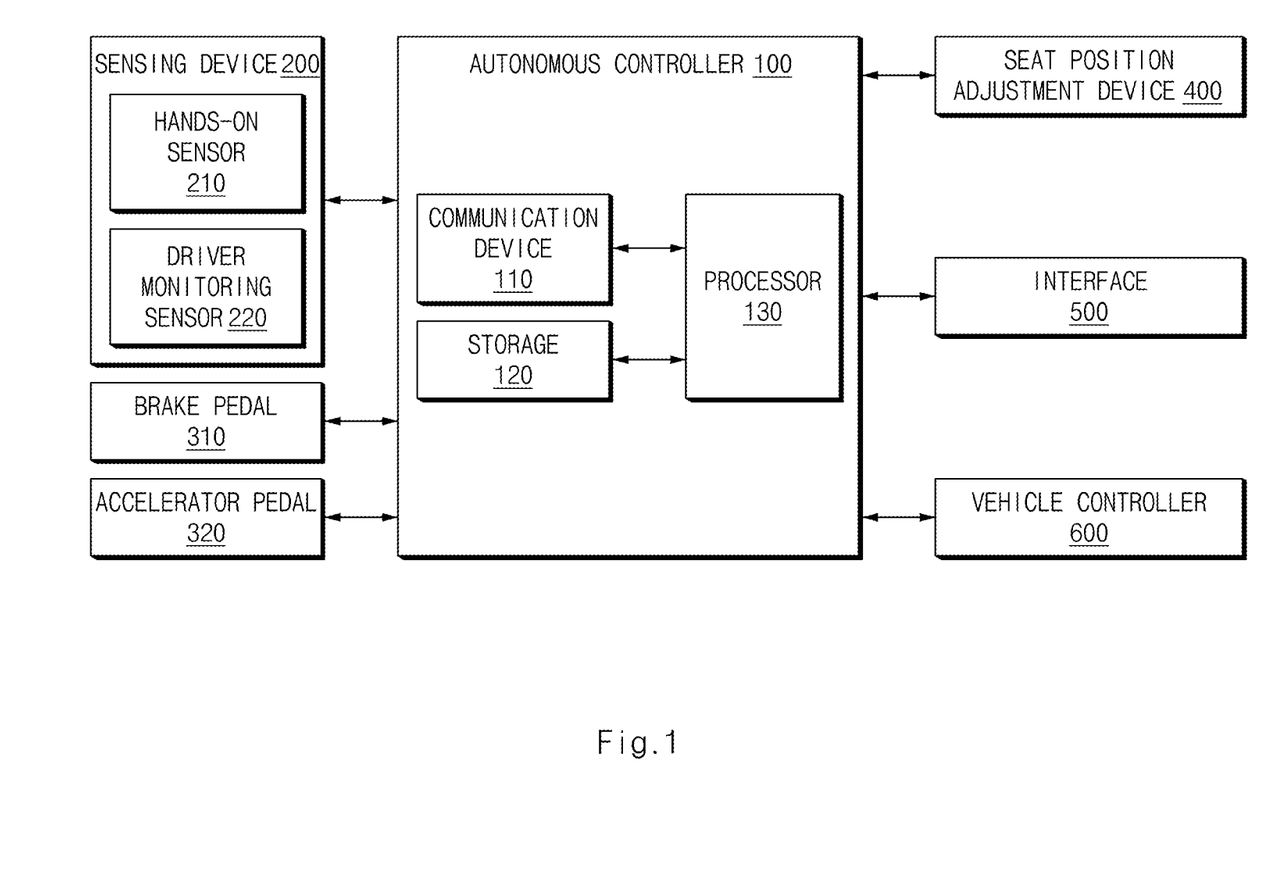
FIG. 1 is a block diagram illustrating a configuration of a vehicle system including an autonomous controller according to one form of the present disclosure.

FIG. 1 is a block diagram illustrating a configuration of a vehicle system including an autonomous controller according to one form of the present disclosure.

Referring to FIG. 1, the vehicle system may include an autonomous controller 100, a sensing device 200, a brake pedal 310, an accelerator pedal 320, a seat position adjustment device 400, an interface 500, and a vehicle controller 600.

The autonomous controller 100 according to one form of the present disclosure may be implemented in a vehicle. In this case, the autonomous controller 100 may be integrally configured with control units in the vehicle or may be implemented as a separate device to be connected with the control units of the vehicle by a separate connection means.

The autonomous controller 100 may control autonomous driving, and may determine whether to enable an autonomous driving mode or may determine to convert the autonomous driving mode into a manual driving mode, based on a current position of the driver's seat. In other words, the autonomous controller 100 may control at least one of whether to enable the autonomous driving function, whether to restrict position adjustment of the driver's seat, whether to hand over control authority, or the like based on a movement position in a forward or backward direction of the driver's seat or an angle of the backrest of the driver's seat. For example, when the movement position in the forward or backward direction of the driver's seat or the angle of the backrest of the driver's seat is greater than a predetermined threshold, the autonomous controller 100 may prohibit the autonomous driving mode from being enabled, may convert the autonomous driving mode into the manual driving mode while the autonomous driving mode is performed, and may restrict position adjustment of the driver's seat.

The autonomous controller 100 according to one form of the present disclosure, which performs the above-mentioned operations, may be implemented in the form of an independent hardware device including a memory and a processor for processing each operation or may be driven in the form of being included in another hardware device such as a microprocessor or a universal computer system.

The autonomous controller 100 may include a communication device 110, a storage 120, and a processor 130.

The communication device 110 may be a hardware device implemented with various electronic circuits to transmit and receive a signal through a wireless or wired connection, which may transmit and receive information with devices in the vehicle based on network communication technology in the vehicle. As an example, the network communication technology in the vehicle may include controller area network (CAN) communication, local interconnect network (LIN) communication, flex-ray communication, or the like.

Furthermore, the communication device 110 may communicate with a server, an infrastructure, another vehicle, or the like outside the vehicle through a wireless Internet technology or a short range communication technology. Herein, the wireless Internet technology may include wireless local area network (WLAN), wireless broadband (WiBro), wireless-fidelity (Wi-Fi), world interoperability for microwave access (WiMAX), or the like. Furthermore, the short range communication technology may include Bluetooth, ZigBee, ultra wideband (UWB), radio frequency identification (RFID), infrared data association (IrDA), or the like.

As an example, the communication device 110 may perform inter-vehicle communication with the sensing device 200, the brake pedal 310, the accelerator pedal 320, the seat position adjustment device 400, the interface 500, the vehicle controller 600, or the like.

The storage 120 may store a sensing result of the sensing device 200, data obtained by the processor 130, or data, an algorithm, and/or the like necessary for an operation of processor 130.

As an example, the storage 120 may store thresholds previously determined by experimental values to determine whether to enable the autonomous driving function. Furthermore, the storage 120 may store a reference value previously determined by experimental values to determine whether to update the thresholds.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected with the communication device 110, the storage 120, or the like and may electrically control the respective components. The processor 130 may be an electrical circuit which executes instructions of software and may perform a variety of data processing and calculation described below. The processor 130 may be, for example, an electronic control unit (ECU), a micro controller unit (MCU), or another sub-controller, which is loaded into the vehicle.

The processor 130 may control autonomous driving, and may determine whether to enable the autonomous driving mode or determine to convert the autonomous driving mode into the manual driving mode based on a current position of the driver's seat. In this case, the current position of the driver's seat may include a movement position in a forward or backward direction of the driver's seat or an angle of the backrest of the driver's seat. In other words, the processor 130 may control at least one of whether to enable the autonomous driving function, whether to restrict position adjustment of the driver's seat, whether to hand over control authority, or the like based on the movement position in the forward or backward direction of the driver's seat or the angle of the backrest of the driver's seat.

When the movement position in the forward or backward direction of the driver's seat is greater than a predetermined first threshold or when the angle of the backrest of the driver's seat is greater than a predetermined second threshold, the processor 130 may prohibit the autonomous driving mode from being enabled.

Figure 2A:
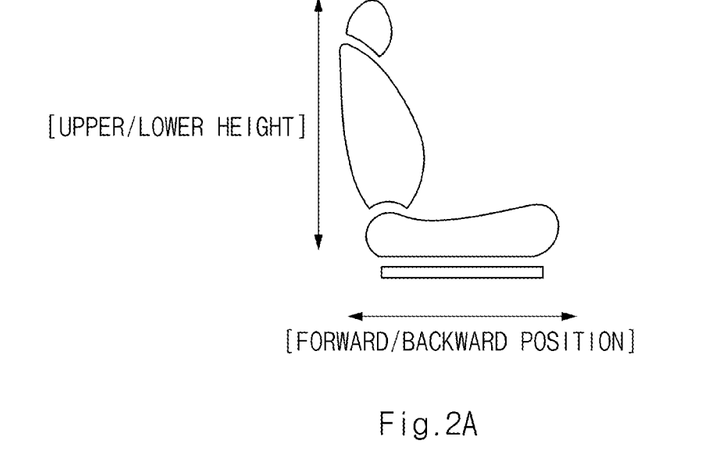
FIGS. 2A and 2B are drawings illustrating a position of the driver's seat for determining to enable an autonomous driving function according to one form of the present disclosure.
Figure 2B:
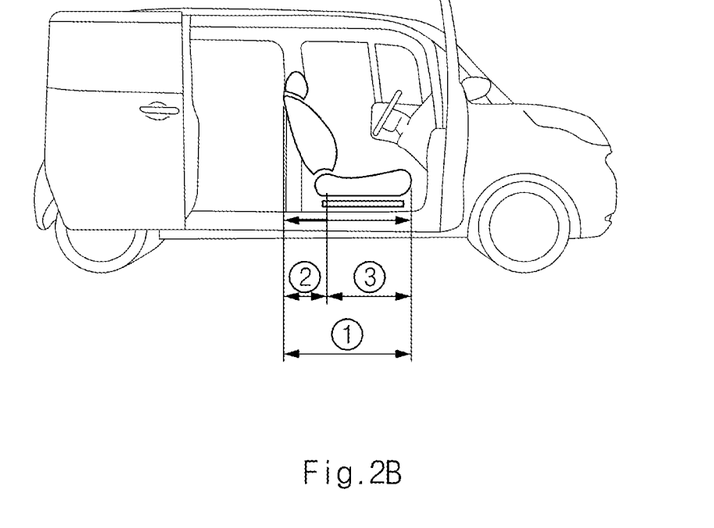

When the driver's seat moves to greater than a predetermined position in the backward direction, the processor 130 may determine that the movement position in the forward or backward direction of the driver's seat is greater than the predetermined first threshold. FIGS. 2A and 2B are drawings illustrating a position of the driver's seat for determining to enable an autonomous driving function according to one form of the present disclosure.

When a position in a forward or backward direction of the driver's seat is greater than a first threshold or when an angle of the backrest of the driver's seat is greater than a second threshold, an autonomous controller 100 according to one form of the present disclosure may prohibit an autonomous driving function from changing to an enable state.

Furthermore, while the autonomous driving function is performed, when the position in the forward or backward direction of the driver's seat is greater than the first threshold or when the angle of the backrest of the driver's seat is greater than the second threshold, the autonomous controller 100 may request the driver to take over control authority and may change to a manual driving mode.

Referring to FIG. 2A, the driver's seat may be adjusted in the direction of an upper/lower height and may be adjusted in position in a forward or backward direction.

Referring to FIG. 2B, when a range where the driver's seat is adjustable in the forward or backward direction of the driver's seat is ①, range ① may be divided into range ② and range ③. Range ② may be a range where it is impossible to enable the autonomous driving function or where it is necessary to request the driver to take over control authority. Range ③ may be a range where it is possible to enable the autonomous driving function.

In other words, the autonomous controller 100 may determine that it is impossible to enable the autonomous driving function or may request the driver to take over control authority when the driver's seat is within range ② in the forward or backward direction, and may determine that it is possible to enable the autonomous driving function when the driver's seat is within range ③.

In this case, range ③ of the driver's seat may be a safety area, which may refer to a sliding range of the driver's seat in a state where it is easy for the driver to always keep his or her eyes on the road, manipulate a steering handle, brake, and use other manipulators.

Figure 3A:
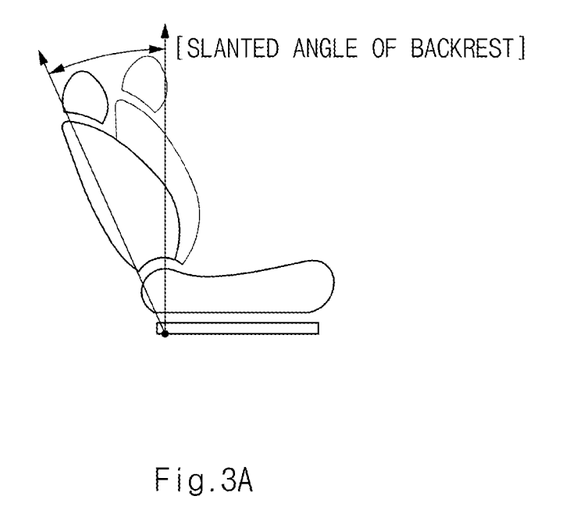
FIGS. 3A and 3B are drawings illustrating an angle of the backrest of the driver's seat for determining to enable an autonomous driving function according to one form of the present disclosure.
Figure 3B:
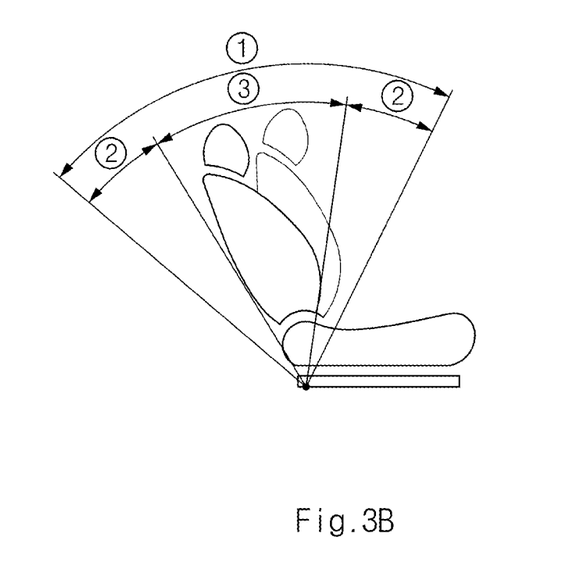

When an angle of the backrest of the driver's seat leans forward or backward over a predetermined angle with respect to a right angle, a processor 130 of FIG. 1 may determine that the angle of the backrest of the driver's seat is greater than the predetermined second threshold FIGS. 3A and 3B are drawings illustrating an angle of the backrest of the driver's seat for determining to enable an autonomous driving function according to one form of the present disclosure.

Referring to FIG. 3A, the backrest of the driver's seat may be adjusted to a certain angle.

Referring to FIG. 3B, when a range where an angle of the backrest of the driver's seat is adjustable is ①, range ① may be divided into range ② and range ③. Range ② may be a range where it is impossible to enable an autonomous driving function or where it is necessary to request the driver to take over control authority. Range ③ may be a range where it is possible to enable the autonomous driving function.

In other words, the autonomous controller 100 may determine that it is impossible to enable the autonomous driving function or may request the driver to take over control authority when the angle of the backrest of the driver's seat is within range ②, and may determine that it is possible to enable the autonomous driving function when the angle of the backrest of the driver's seat is within range ③.

In this case, range ③ of the driver's seat may be a safety area, which may refer to a range of a reclining angle of the driver's seat in a state where it is easy for the driver to always keep his or her eyes on the road, manipulate a steering handle, brake, and use other manipulators.

While an autonomous driving mode is performed, and when a movement position in a forward or backward direction of the driver's seat is greater than a predetermined first threshold or when an angle of the backrest of the driver's seat is greater than a predetermined second threshold, the processor 130 may restrict position adjustment of the driver's seat and may request the driver to take over control authority, such that a vehicle travels in a manual driving mode.

In the state where the movement position in the forward or backward direction of the driver's seat greater than the predetermined first threshold or where the angle of the backrest of the driver's seat is greater than the predetermined second threshold, the processor 130 may determine whether the driver keeps his or her hands on the steering wheel, whether the driver manipulates the brake pedal, and whether the driver manipulates the accelerator pedal. When there is at least one of them, the processor 130 may control to perform position adjustment of the driver's seat.

Furthermore, in the state where the movement position in the forward or backward direction of the driver's seat is greater than the predetermined first threshold or where the angle of the backrest of the driver's seat is greater than the predetermined second threshold, and when there is at least one of whether the driver keeps his or her hands on the steering wheel, whether the driver manipulates the brake pedal, or whether the driver manipulates the accelerator pedal, the processor 130 may control the first threshold or the second threshold. In other words, the processor 130 may maintain or increase the first threshold or the second threshold to update the first threshold or the second threshold.

When the movement position in the forward or backward direction of the driver's seat is greater than the predetermined first threshold or when the angle of the backrest of the driver's seat is greater than the predetermined second threshold, and when the driver keeps his or her hands on the steering hand, the processor 130 may determines a position of the face of the driver or positions of the eyes of the driver and may adjust the first threshold or the second threshold.

When a distance from the position of the face of the driver to the driver's seat is greater than or equal to a predetermined distance, the processor 130 may prohibit the first threshold or the second threshold from being adjusted.

Figure 4A:
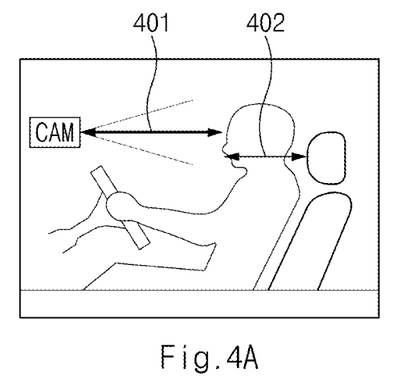
FIGS. 4A, 4B, and 4C are drawings illustrating a threshold update condition according to one form of the present disclosure.
Figure 4B:
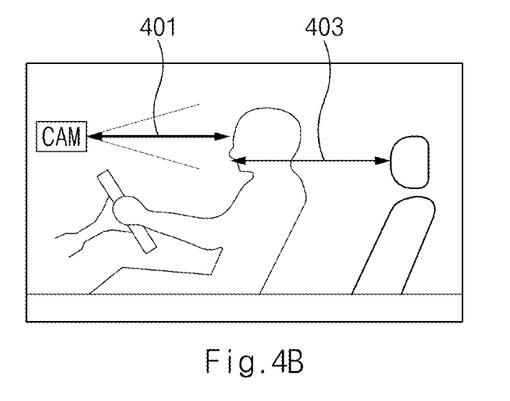
Figure 4C:
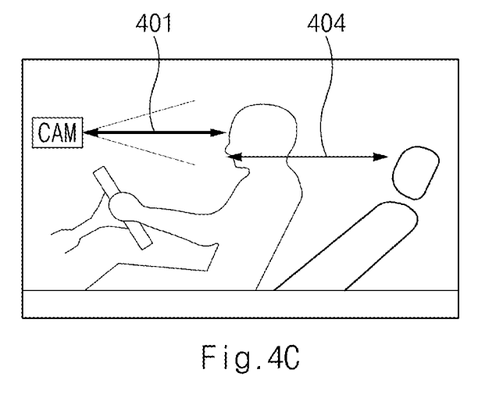

When the distance from the position of the face of the driver to the driver's seat is greater than a distance from the face of the driver to a camera CAM capturing the face of the driver over a predetermined reference value, the processor 130 may prohibit the first threshold or the second threshold from being adjusted. FIGS. 4A to 4C are drawings illustrating a threshold update condition according to one form of the present disclosure. Referring to FIG. 4A, when a position in a forward or backward direction of the driver's seat and an angle of the backrest of the driver's seat are within a normal position, that is, range ①, distance 402 from the face of the driver to the driver's seat may be within a predetermined distance. Furthermore, when distance 402 from the face of the driver to the driver's seat is shorter than distance 401 from the face of the driver to a camera CAM, an autonomous controller 100 of FIG. 1 may determine that it is possible to update first and second thresholds for determining to enable an autonomous driving function.

Referring to FIG. 4B, when the driver's seat moves in a backward direction and when distance 403 from the face of the driver to the driver's seat is greater than a predetermined reference value, the autonomous controller 100 may determine that it is impossible to update the first and second thresholds for determining to enable the autonomous driving function. In this case, when distance 403 from the face of the driver to the driver's seat is longer than distance 401 from the face of the driver to the camera CAM, the autonomous controller 100 may determine that it is impossible to update the first and second thresholds for determining to enable the autonomous driving function.

Referring to FIG. 4C, when the backrest of the driver's seat leans back and when distance 404 from the face of the driver to the driver's seat is greater than the predetermined reference value, the autonomous controller 100 may determine that it is impossible to update the first and second thresholds for determining to enable the autonomous driving function. In this case, when distance 404 from the face of the driver to the driver's seat is longer than distance 401 from the face of the driver to the camera CAM, the autonomous controller 100 may determine that it is impossible to update the first and second thresholds for determining to enable the autonomous driving function.

A sensing device 200 of FIG. 1 may include a hands-on sensor 210 and a driver monitoring sensor 220. The hands-on sensor 210 may sense whether the driver (or a user) keeps his or her hands on the steering wheel. The driver monitoring sensor 220 may sense a state (e.g., a position of the face, or the like) of the driver.

To this end, the hands-on sensor 210 may include a body temperature sensor, a decompression sensor, or the like. The driver monitoring sensor 220 may include a camera, an ultrasonic sensor, or the like.

The brake pedal 300 may transmit a brake pedal signal to the autonomous controller 100 when pressed by the driver.

The seat position adjustment device 400 may be controlled by the autonomous controller 100 to control an angle, a height, a forward position, or a backward position of the driver's seat.

The seat position adjustment device 400 may sense a position in a forward or backward direction of the driver's seat, a height in an upper or lower direction of the driver's seat, a slanted angle of the backrest of the driver's seat, or the like. Furthermore, the seat position adjustment device 400 may adjust a position in a forward/backward direction of the driver's seat, a height in an upper/lower direction of the driver's seat, a slanted angle of the backrest of the driver's seat, or the like by a switch input of the driver, a request of the system, or the like.

The interface 500 may output that the position of the driver's seat is automatically adjusted when the position of the driver's seat is adjusted, such that the driver may recognize it. Furthermore, the interface 500 may output a screen requesting the driver to take over control authority to receive feedback (e.g., approval or denial) from the driver.

As an example, the interface 500 may be implemented as a head up display (HUD), a cluster, an audio video navigation (AVN), a human machine interface (HMI), a user selection menu (USM), or the like.

The interface 500 may include an input means for receiving a control command from a user and an output means for outputting an operation state, an operation result, or the like of the autonomous controller 100.

Herein, the input means may include a key button and may further include a mouse, a joystick, a jog shuttle, a stylus pen, or the like. Furthermore, the input means may further include a soft key implemented on a display.

The output means may include the display and may further include a voice output means such as a speaker. In this case, when a touch sensor such as a touch film, a touch sheet, or a touch pad is provided in the display, the display operates as a touchscreen and may be implemented in a form where the input means and the output means are integrated with each other. As an example, the output means may output conversion of the autonomous driving mode and the manual driving mode, an autonomous driving enable state, an autonomous driving disable state, an autonomous driving impossible notification, an autonomous driving possible notification, or the like. As an example, the output means may be implemented as a cluster, a head up display (HUD), an audio video navigation (AVN), a display, a warning sound speaker, a haptic device, or the like.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The vehicle controller 600 may control acceleration, deceleration, braking, steering, or the like of the vehicle.

To use the autonomous driving function, the vehicle controller 600 may basically determine whether a related system (e.g., a sensor, an actuator, or the like) is in a normal state.

One form of the present disclosure may propose a method for detecting a position of the driver's seat and determining whether the position of the driver's seat is within a suitable area (e.g., a seat area where it is possible for the driver to immediately control the vehicle when handing over control authority) and determining whether it is possible to use the autonomous driving function.

Furthermore, one form of the present disclosure may propose a method for continuing detecting a position of the driver's seat while the autonomous driving function is performed, restricting position adjustment of the driver's seat or controlling such that the position of the driver's seat departs from an unsuitable position, when the position of the driver's seat is adjusted to the unsuitable area, generating a request for taking over control authority, and restricting the use of the system.

Figure 5:
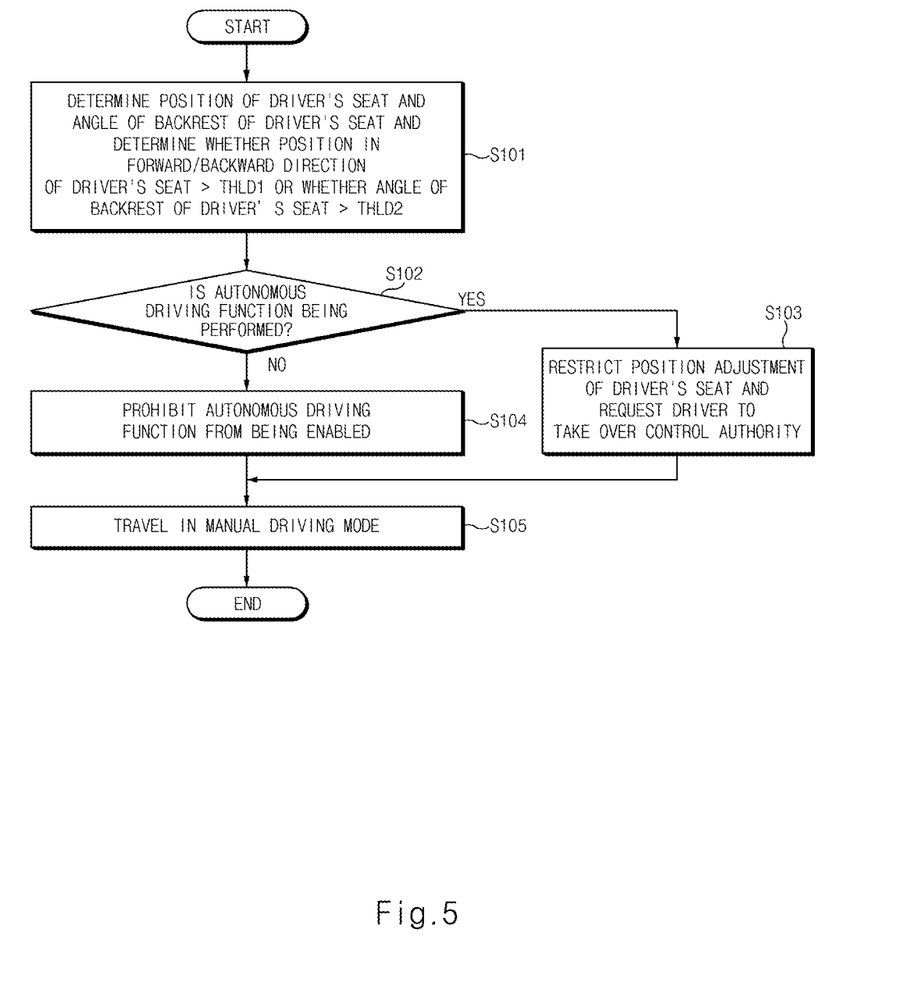
FIG. 5 is a flowchart illustrating a method for controlling autonomous driving by determining a position of the driver's seat and an angle of the backrest of the driver's seat according to one form of the present disclosure.
Figure 6:
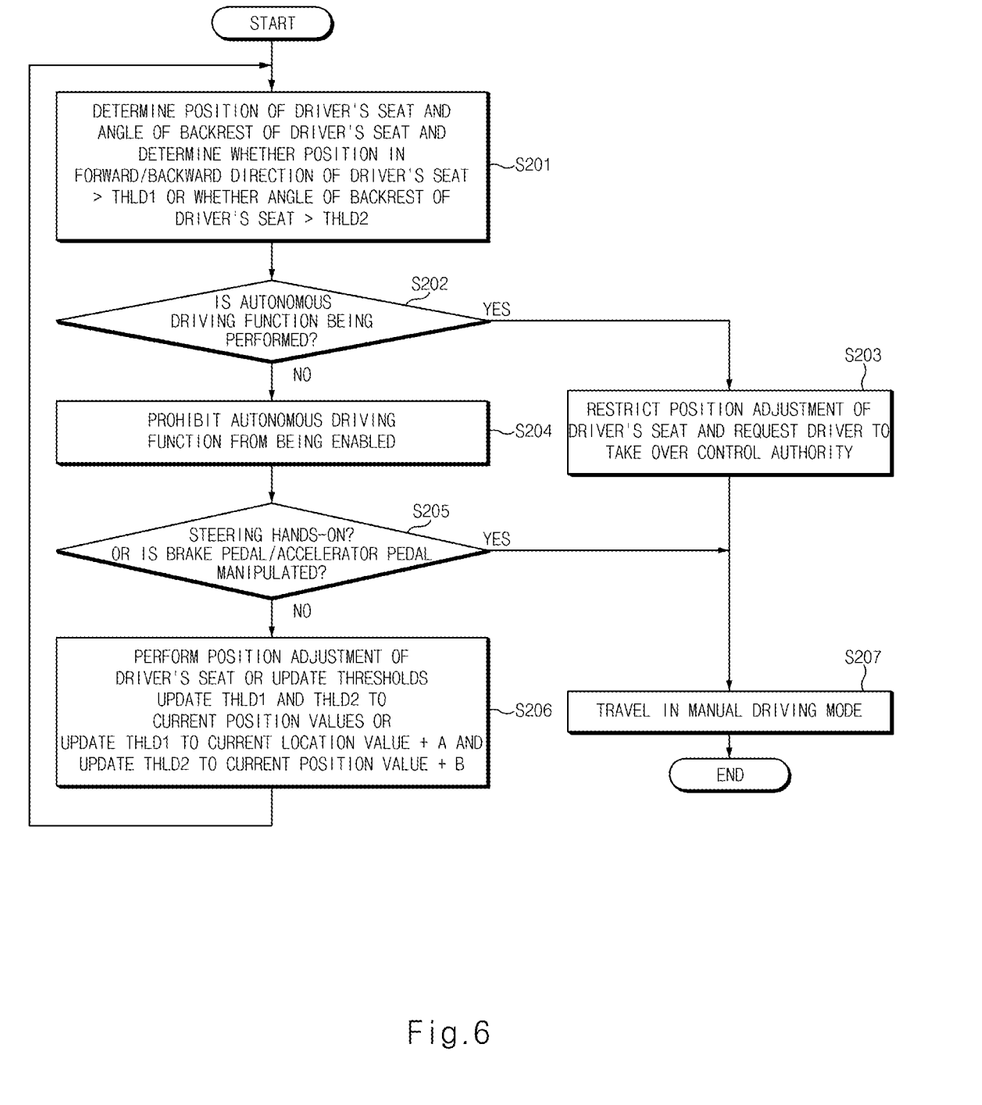
FIG. 6 is a flowchart illustrating a method for controlling autonomous driving by determining a position of the driver's seat and an angle of the backrest of the driver's seat according to one form of the present disclosure.
Figure 7:
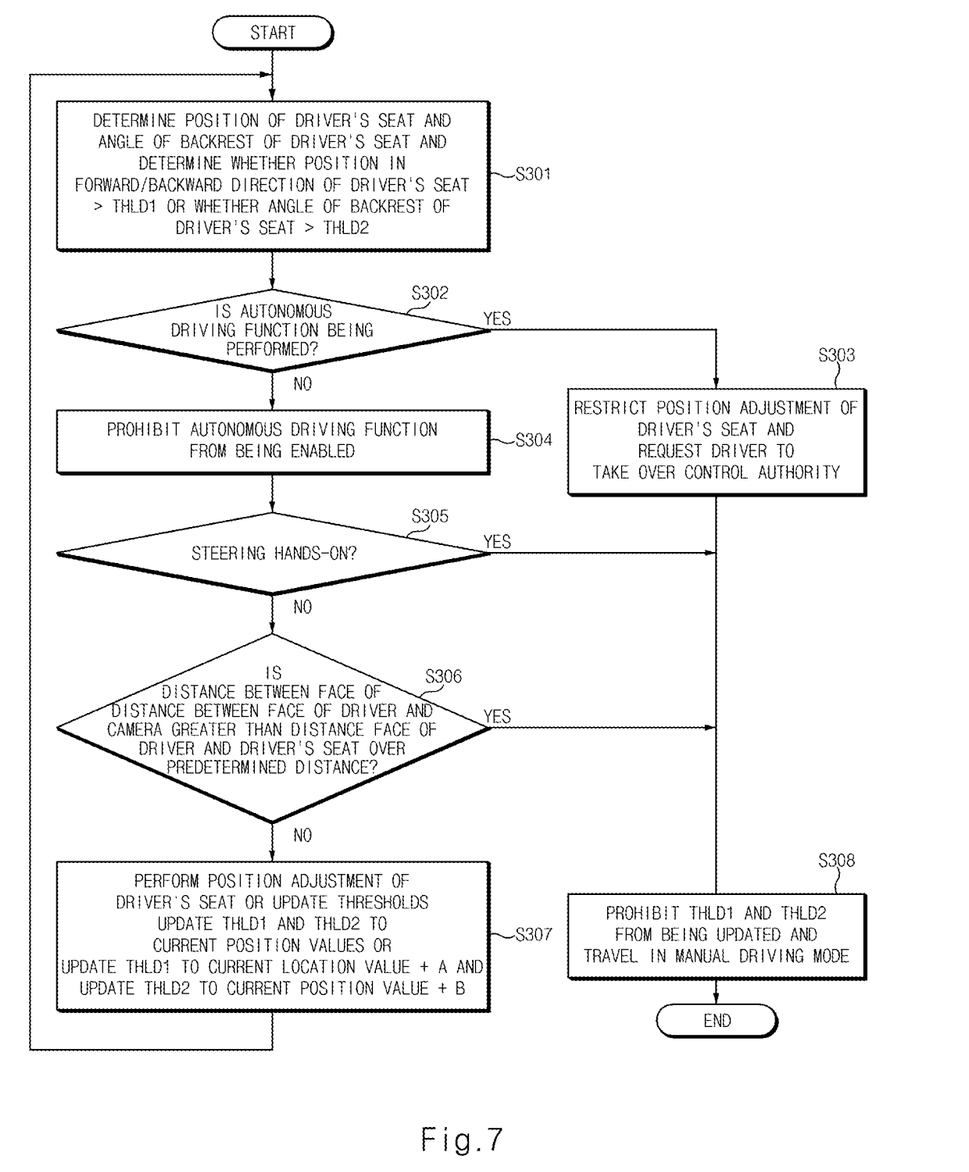
FIG. 7 is a flowchart illustrating a method for controlling autonomous driving by determining a position of the driver's seat and an angle of the backrest of the driver's seat according to one form of the present disclosure.

A description will be given in detail of a method for controlling autonomous driving by determining a position of the driver's seat and an angle of the backrest of the driver's seat according to one form of the present disclosure with reference to FIGS. 5 to 7. FIGS. 5 to 7 are flowcharts illustrating a method for controlling autonomous driving by determining a position of the driver's seat and an angle of the backrest of the driver's seat according to one form of the present disclosure.

Hereinafter, it is assumed that an autonomous controller 100 of FIG. 1 performs a process of FIGS. 5 to 7. Furthermore, in a description of FIGS. 5 to 7, an operation described as being performed by an apparatus may be understood as being controlled by a processor 130 of the autonomous controller 100.

Referring to FIG. 5, in S101, the apparatus may determine whether a position of the driver's seat and an angle of the backrest of the driver's seat are greater than predetermined thresholds Thld1 and Thld2, based on information about the position of the driver's seat and the angle of the backrest of the driver's seat, which is received from a seat position adjustment device 400 of FIG. 1. The thresholds Thld1 and Thld2 may be preset by experimental values. A position where range ② of FIG. 2B starts may be set to the threshold Thld1, and a position where range ② starts may be set to the threshold Thld2.

When a position in a forward or backward direction of the driver's seat is greater than the predetermined threshold Thld1 or when an angle of the backrest of the driver's seat is greater than the predetermined threshold Thld2 in S101, in S102, the apparatus may determine whether an autonomous driving function is being performed. While the autonomous driving function is performed, in S103, the apparatus may restrict position adjustment of the driver's seat and may request a driver to take over control authority. In S105, the apparatus may control a vehicle to travel in a manual driving mode. In this case, the manual driving mode may refer to a driving mode in which the driver directly drive the vehicle, rather than an autonomous driving mode.

Meanwhile, when the autonomous driving function is not performed, in S104, the apparatus may prohibit the autonomous driving function from being enabled. In S105, the apparatus may control the vehicle to travel in the manual driving mode.

Referring to FIG. 6, in S201, the apparatus may determine whether the position of the driver's seat and the angle of the backrest of the driver's seat are greater than predetermined thresholds Thld1 and Thld2, based on information about the position of the driver's seat and the angle of the backrest of the driver's seat, which is received from the seat position adjustment device 400.

When the position in the forward or backward direction of the driver's seat is greater than the predetermined threshold Thld1 or when the angle of the backrest of the driver's seat is greater than the predetermined threshold Thld2, in S202, the apparatus may determine whether the autonomous driving function is being performed. While the autonomous driving function is performed, in S203, the apparatus may restrict position adjustment of the driver's seat and may request the driver to take over control authority. In S207, the autonomous controller 100 may control the vehicle to travel in the manual driving mode.

Meanwhile, when the autonomous driving function is not performed, in S204, the apparatus may prohibit the autonomous driving function from being enabled. In S205, the apparatus may determine whether the driver keeps his or her hands on the steering wheel or whether the driver manipulates a brake pedal/accelerator pedal.

As such, in the state where the position in the forward or backward direction of the driver's seat greater than the predetermined threshold Thld1 or where the angle of the backrest of the driver's seat is greater than the predetermined threshold Thld2, when the driver keeps his or her hands on the steering wheel or when the driver manipulates the brake pedal/accelerator pedal, in S206, the apparatus may control to perform position adjustment of the driver's seat and may update the thresholds Thld1 and Thld2.

In other words, the apparatus may update the thresholds Thld1 and Thld2 to current position values or may update the threshold Thld1 or Thld2 to a value obtained by adding a predetermined value (A or B) to the current position value. In other words, although the position of the driver's seat is greater than a predetermined threshold, when the driver keeps his or her hands on the steering wheel or when the driver manipulates the brake pedal/the accelerator pedal, the apparatus may perform position adjustment of the driver's seat and may increase the thresholds, thus expanding an autonomous driving enable area.

Meanwhile, in the state where the position in the forward or backward direction of the driver's seat is greater than the predetermined threshold Thld1 or where the angle of the backrest of the driver's seat is greater than the predetermined threshold Thld2, when the driver does not keep his or her hands on the steering wheel or when the driver does not manipulate the brake pedal/accelerator pedal, in S207, the apparatus may hand over control authority to the driver such that the vehicle travels in the manual driving mode.

Referring to FIG. 7, in S301, the apparatus may determine whether the position of the driver's seat and the angle of the backrest of the driver's seat are greater than predetermined thresholds Thld1 and Thld2, based on information about the position of the driver's seat and the angle of the backrest of the driver's seat, which is received from the seat position adjustment device 400.

When the position in the forward or backward direction of the driver's seat is greater than the predetermined threshold Thld1 or when the angle of the backrest of the driver's seat is greater than the predetermined threshold Thld2, in S302, the apparatus may determine whether the autonomous driving function is being performed. While the autonomous driving function is performed, in S303, the apparatus may restrict position adjustment of the driver's seat and may request the driver to take over control authority. In S308, the apparatus may control the vehicle to travel in the manual driving mode.

Meanwhile, when the autonomous driving function is not performed, in S304, the apparatus may prohibit the autonomous driving function from being enabled. In S305, the apparatus may determine whether the driver keeps his or her hands on the steering wheel.

As such, in the state where the position in the forward or backward direction of the driver's seat is greater than the predetermined threshold Thld1 or where the angle of the backrest of the driver's seat is greater than the predetermined threshold Thld2, when the driver keeps his or her hands on the steering wheel, the apparatus may determine positions of eyes of the driver (or a position of the face of the driver) and may calculate a distance between the face of the driver and the driver's seat and a distance between the face of the driver and a camera.

In S306, the apparatus may determine whether the distance between the face of the driver and the camera is greater than the distance between the face of the driver and the driver's seat over a predetermined distance. When the distance between the face of the driver and the camera is greater than the distance between the face of the driver and the driver's seat over the predetermined distance, in S308, the apparatus may prohibit the thresholds Thld1 and Thld2 from being updated and may control the vehicle to travel in the manual driving mode.

When the distance between the face of the driver and the camera is not greater than the distance between the face of the driver and the driver's seat over the predetermined distance, in S307, the apparatus may perform position adjustment of the driver's seat and may update the thresholds Thld1 and Thld2.

In other words, when the distance between the face of the driver to the camera is shorter than the distance between the face of the driver and the driver's seat, the apparatus may fail to update the thresholds Thld1 and Thld2.

As such, when the position (e.g., the position in the forward/backward direction) of the driver's seat or the angle of the backrest of the driver's seat in the autonomous driving mode is unsuitable for driving the vehicle in the manual driving mode, the apparatus according to one form of the present disclosure may prevent the autonomous driving function from being enabled, and may restrict position adjustment of the driver's seat or may hand over control authority to the driver while the autonomous driving function is performed, thus performing safe driving.

Furthermore, one form of the present disclosure may keep control ability of the driver high, thus minimizing risk when urgently handing over control authority or when the autonomous driving function is released.

Figure 8:
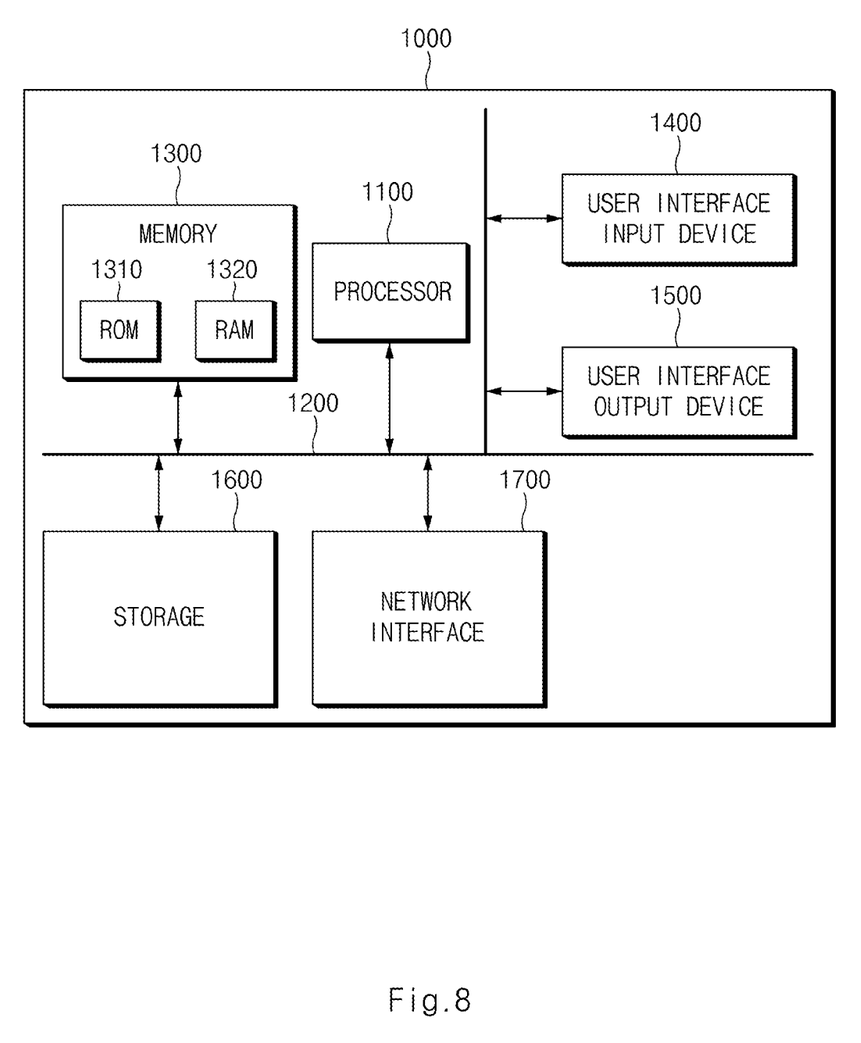
FIG. 8 is a block diagram illustrating a computing system according to one form of the present disclosure.

FIG. 8 is a block diagram illustrating a computing system according to one form of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with various forms disclosed herein may be embodied directly in hardware or a software module executed by the processor 1100, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may determine whether a position of the driver's seat is located within a safety area of the driver's seat to determine whether to enable an autonomous driving function, may monitor the position of the driver's seat while the autonomous driving function is performed, and may request the driver to take over control authority or may restrict position adjustment of the driver's seat while the autonomous driving function is performed, when the position of the driver's seat departs from the safety area, thus increasing safety of autonomous driving.

In addition, various effects ascertained directly or indirectly through the present disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous controller comprising:
a processor configured to:
control autonomous driving,
determine whether to enable an autonomous driving mode or to convert the autonomous driving mode into a manual driving mode based on a current position of a seat of a driver, and
control whether to enable the autonomous driving mode and whether to hand over control authority based on a movement position in a forward or backward direction of the seat of the driver or on an angle of a backrest of the seat of the driver; and
a storage configured to store data and an algorithm run by the processor.

2. The autonomous controller of claim 1, wherein the processor is configured not to enable the autonomous driving mode when the movement position in the forward or backward direction of the seat of the driver is greater than a first threshold or when the angle of the backrest of the seat of the driver is greater than a second threshold.

3. The autonomous controller of claim 2, wherein the processor is configured to perform position adjustment of the seat of the driver when,
while the driver is keeping his or her hands on a steering wheel, manipulating a brake pedal, or manipulating an accelerator pedal,
the movement position in the forward or backward direction of the seat of the driver is greater than the first threshold or the angle of the backrest of the seat of the driver is greater than the second threshold.

4. The autonomous controller of claim 2, wherein the processor is configured to adjust the first threshold or the second threshold when,
while the driver is keeping his or her hands on a steering wheel, manipulating a brake pedal, or manipulating an accelerator pedal,
the movement position in the forward or backward direction of the seat of the driver is greater than the first threshold or the angle of the backrest of the seat of the driver is greater than the predetermined second threshold.

5. The autonomous controller of claim 4, wherein the processor is configured to maintain or increase the first threshold or the second threshold.

6. The autonomous controller of claim 2, wherein the processor is configured to adjust the first threshold or the second threshold based on a position of face or eyes of the driver,
when the driver keeps his or her hands on a steering wheel and the movement position in the forward or backward direction of the seat of the driver is greater than the first threshold or
when the driver keeps his or her hands on a steering wheel and the angle of the backrest of the seat of the driver is greater than the second threshold.

7. The autonomous controller of claim 6, wherein the processor is configured to refrain from adjusting the first threshold or the second threshold when a distance between the position of the face of the driver and the seat of the driver is greater than or equal to a predetermined distance.

8. The autonomous controller of claim 7, wherein the processor is configured to refrain from adjusting the first threshold or the second threshold when the distance between the face of the driver and the seat of the driver is greater, by more than a predetermined reference value, than a distance between the face of the driver and a camera capturing the face of the driver.

9. The autonomous controller of claim 1, wherein the processor is configured to restrict position adjustment of the seat of the driver while the autonomous driving mode is being performed, when the movement position in the forward or backward direction of the seat of the driver is greater than a first threshold, or when the angle of the backrest of the seat of the driver is greater than a second threshold.

10. The autonomous controller of claim 1, wherein the processor is configured to request a driver to take over the control authority while the autonomous driving mode is being performed, when the movement position in the forward or backward direction of the seat of the driver is greater than a first threshold, or when the angle of the backrest of the seat of the driver is greater than a second threshold.

11. The autonomous controller of claim 1, wherein the processor is configured to determine that the movement direction in the forward or backward direction of the seat of the driver is greater than a first threshold when the seat of the driver moves by more than a predetermined position in the backward direction.

12. The autonomous controller of claim 1, wherein the processor is configured to determine that the angle of the backrest of the seat of the driver is greater than a second threshold when the angle of the backrest of the seat of the driver leans forward or backward over a predetermined angle with respect to a right angle.

13. A vehicle system comprising:
an autonomous controller configured to:
control autonomous driving,
determine whether to enable an autonomous driving mode or to convert the autonomous driving mode into a manual driving mode based on a current position of a seat of the driver, and
control whether to enable the autonomous driving mode and whether to hand over control authority based on a movement position in a forward or backward direction of the seat of the driver or on an angle of a backrest of the seat of the driver; and
a seat position adjustment device configured to perform or restrict position adjustment of the seat of the driver depending on a command of the autonomous controller.

14. The vehicle system of claim 13, further comprising:
a hands-on sensor configured to sense that the driver has his or her hands on a steering wheel; and
a driver monitoring sensor configured to sense a position of the face of the driver.

15. The vehicle system of claim 13, wherein the autonomous controller is configured to prohibit the autonomous driving mode from being enabled when the movement position in the forward or backward direction of the seat of the driver is greater than a first threshold or when the angle of the backrest of the seat of the driver is greater than a second threshold.

16. An autonomous control method comprising:
detecting, by a processor, a position of a seat of a driver;
determining, by a processor, whether to enable an autonomous driving mode or to convert the autonomous driving mode into a manual driving mode based on the position of the seat of the driver; and
controlling, by a processor, autonomous driving in a mode determined in the determining step,
wherein the determining step includes:
controlling, based on a movement position in a forward or backward direction of the seat of the driver or on an angle of a backrest of the seat of the driver, whether to enable the autonomous driving mode and whether to hand over control authority.

17. The autonomous control method of claim 16, wherein the determining step includes:
prohibiting the autonomous driving mode from being enabled when the movement position in the forward or backward direction of the seat of the driver seat is greater than a first threshold or when the angle of the backrest of the seat of the driver is greater than a second threshold.

18. The autonomous control method of claim 17, wherein the determining step includes:
performing position adjustment of the seat of the driver, while the driver is keeping his or her hands on a steering wheel, manipulating a brake pedal, or manipulating an accelerator pedal,
when the movement position in the forward or backward direction of the seat of the driver is greater than the first threshold or where the angle of the backrest of the seat of the driver is greater than the second threshold.

19. The autonomous control method of claim 16, wherein the determining step includes:
restricting position adjustment of the seat of the driver while the autonomous driving mode is being performed, when the movement position in the forward or backward direction of the seat of the driver is greater than a first threshold or when the angle of the backrest of the seat of the driver is greater than a second threshold.

20. The autonomous control method of claim 16, wherein the determining step includes:
requesting the driver to take over the control authority, while the autonomous driving mode is being performed, when the movement position in the forward or backward direction of the seat of the driver is greater than a first threshold or when the angle of the backrest of the seat of the driver is greater than a second threshold.

* * * * *